United States Patent
Kriellaars

[15] 3,691,457
[45] Sept. 12, 1972

[54] MOISTURE MEASUREMENT OF GRAIN

[72] Inventor: Johannes Cornelius Kriellaars, St. Boniface, Manitoba, Canada

[73] Assignee: CAE Industries Ltd.

[22] Filed: Aug. 28, 1970

[21] Appl. No.: 67,683

[52] U.S. Cl. ................................................324/61 R
[51] Int. Cl. ..............................................G01r 27/26
[58] Field of Search ..........................324/61; 317/246

[56] References Cited

UNITED STATES PATENTS

| | | | |
|---|---|---|---|
| 2,422,742 | 6/1947 | Odessey | 324/61 |
| 2,593,766 | 4/1952 | Kimball et al. | 324/61 |
| 2,603,422 | 7/1952 | Sargeaunt | 236/91 |
| 2,693,575 | 11/1954 | Greenwood et al. | 324/61 |
| 2,759,147 | 8/1956 | Stein | 324/61 |
| 3,000,064 | 9/1961 | Dietert et al. | 22/89 |
| 3,226,635 | 12/1965 | Moe | 324/61 |

FOREIGN PATENTS OR APPLICATIONS 1,003,062    3/1952    France.....................177/210

Primary Examiner—Stanley T. Krawczewicz
Attorney—Cushman, Darby & Cushman

[57] ABSTRACT

Apparatus for the measurement of moisture in grain and other material. It weighs the sample as added, to ensure a constant sample weight; it dumps the sample in a predictable manner into a capacitive cell; it effects a capacitive measurement and compensates for the temperature of the specimen. The measurement of capacitance provides a measure of the moisture content. In order to compensate for variations in the volume of a weighed sample, arising from grain size, the capacitive cell is cylindrical in form and extends vertically, but lower parts of its metal walls are cut away to provide a lesser capacitance per unit height over the lower parts of the cell compared with upper parts of the cell.

13 Claims, 12 Drawing Figures

| CAE INDUSTRIES LTD. Moisture Master 101 | | | AMBER DURUM WHEAT SAMPLE WEIGHT: 100 GRAMS INITIAL T.C. SETTING: | | | USE GRAM COUNTERWEIGHT | | |
|---|---|---|---|---|---|---|---|---|
| *T.C. SET | DIAL READING | MOISTURE PERCENTAGE | *T.C. SET | DIAL READING | MOISTURE PERCENTAGE | *T.C. SET | DIAL READING | MOISTURE PERCENTAGE |
| 35 | 40.0 | 10.99 | 35 | 54.5 | 14.06 | 35 | 69.0 | 17.14 |
| 35 | 40.5 | 11.10 | 35 | 55.0 | 14.17 | 35 | 69.5 | 17.24 |
| 35 | 41.0 | 11.20 | 35 | 55.5 | 14.28 | 35 | 70.0 | 17.35 |
| 35 | 41.5 | 11.31 | 35 | 56.0 | 14.38 | 35 | 70.5 | 17.46 |
| 35 | 42.0 | 11.41 | 35 | 56.5 | 14.49 | 35 | 71.0 | 17.56 |
| 35 | 42.5 | 11.52 | 35 | 57.0 | 14.59 | 35 | 71.5 | 17.67 |
| 35 | 43.0 | 11.63 | 35 | 57.5 | 14.70 | 35 | 72.0 | 17.77 |
| 35 | 43.5 | 11.73 | 35 | 58.0 | 14.81 | 35 | 72.5 | 17.88 |
| 35 | 44.0 | 11.84 | 35 | 58.5 | 14.91 | 35 | 73.0 | 17.99 |
| 35 | 44.5 | 11.94 | 35 | 59.0 | 15.02 | 35 | 73.5 | 18.09 |
| 35 | 45.0 | 12.05 | 35 | 59.5 | 15.12 | 35 | 74.0 | 18.20 |
| 35 | 45.5 | 12.16 | 35 | 60.0 | 15.23 | 35 | 74.5 | 18.30 |
| 35 | 46.0 | 12.26 | 35 | 60.5 | 15.34 | 35 | 75.0 | 18.41 |
| 35 | 46.5 | 12.37 | 35 | 61.0 | 15.44 | 35 | 75.5 | 18.52 |
| 35 | 47.0 | 12.47 | 35 | 61.5 | 15.55 | 35 | 76.0 | 18.62 |
| 35 | 47.5 | 12.58 | 35 | 62.0 | 15.65 | 35 | 76.5 | 18.73 |
| 35 | 48.0 | 12.69 | 35 | 62.5 | 15.76 | 35 | 77.0 | 18.83 |
| 35 | 48.5 | 12.79 | 35 | 63.0 | 15.87 | 35 | 77.5 | 18.94 |
| 35 | 49.0 | 12.90 | 35 | 63.5 | 15.97 | 35 | 78.0 | 19.05 |
| 35 | 49.5 | 13.00 | 35 | 64.0 | 16.08 | 35 | 78.5 | 19.15 |
| 35 | 50.0 | 13.11 | 35 | 64.5 | 16.18 | 35 | 79.0 | 19.26 |
| 35 | 50.5 | 13.22 | 35 | 65.0 | 16.29 | | | |
| 35 | 51.0 | 13.32 | 35 | 65.5 | 16.40 | | | |
| 35 | 51.5 | 13.43 | 35 | 66.0 | 16.50 | | | |
| 35 | 52.0 | 13.53 | 35 | 66.5 | 16.61 | | | |
| 35 | 52.5 | 13.64 | 35 | 67.0 | 16.71 | | | |
| 35 | 53.0 | 13.75 | 35 | 67.5 | 16.82 | | | |
| 35 | 53.5 | 13.85 | 35 | 68.0 | 16.93 | | | |
| 35 | 54.0 | 13.96 | 35 | 68.5 | 17.03 | | | |

*TEMPERATURE COMPENSATION

FIG. 8

MOISTURE MEASUREMENT OF GRAIN

This invention relates to improvements in the measurement of parameters such as moisture content of particulate or granular material.

One example of the type of measurement to which the present invention can be applied is the measurement of moisture content in samples of grain. It is well known that some indication of the moisture content in a sample of grain can be obtained by either a resistivity measurement or a capacitance measurement. Measurements based on electrical conductivity do not appear capable of an acceptable accuracy unless the sample is first ground to a flour, and either weighed or compressed to a predetermined value. For this reason, measurements based on electrical resistivity are hardly practical and the present invention relates to measurement of parameters such as moisture content in bulk samples by measurement of electrical capacitance.

Our United States patent application Ser. No. 5,014 filed Jan. 22, 1970, entitled "Measurement of Parameters such as Moisture in Bulk Samples" describes and claims apparatus adapted to measure capacitance-affecting parameters of particulate or granular material and which comprises: a sample receiving receptacle; spring means by which the receptacle is supported; indicating means providing an indication when the weight of material received by the receptacle reaches a predetermined value; a capacitance cell including spaced metal surfaces; dump means by which the material in the receptacle can be dumped into the cell to act as a dielectric between the said metal surfaces; an oscillatory circuit the operating frequency of which is determined by the capacitance of the said cell; temperature sensitive means associated with the cell and adapted automatically to effect a change in the said operating frequency compensatory of any frequency change caused by deviation of the temperature of the said cell; discriminatory means arranged to receive the output from the said oscillatory circuit and to provide an indication of the sense of the deviation of the operating frequency of that circuit from a predetermined value; calibrated adjustment means by which the frequency of the said oscillatory circuit can be independently adjusted to restore it to the said predetermined value; whereby an operator, can by operating the adjustment means to reduce the said deviation of the operating frequency to zero, obtain from the calibration of the adjustment means an indication of the value of the said parameter.

The present invention is an improvement on the apparatus disclosed in the said patent application, and enables accurate measurements to be made despite variation in the grain size of a sample.

The invention will now be described, by way of example, with reference to the accompanying drawings, in which:

FIG. 8 is a representation of a calibration chart (one of a set of such charts) used with the apparatus shown;

Figure 1:
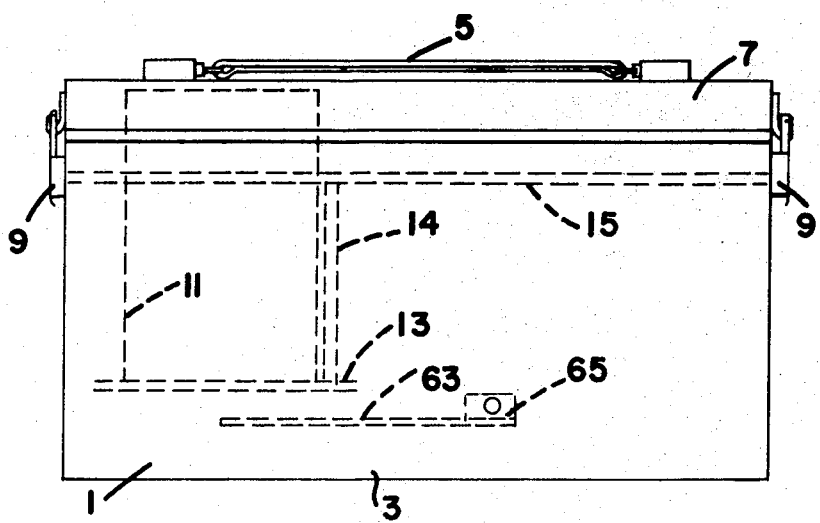
FIG. 1 is a side elevation of a moisture measuring unit suitable for ascertaining the moisture content in a bulk sample of grain.
Figure 2:
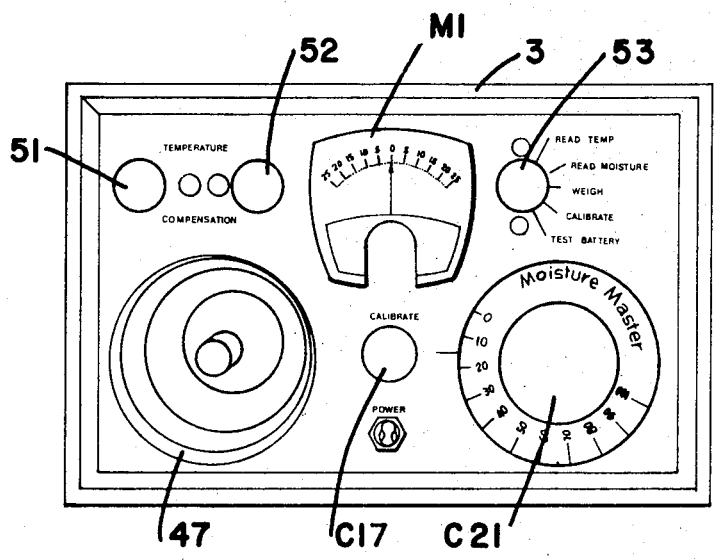
FIG. 2 is a pictorial plan view of the unit shown in FIG. 1 with a cover removed.

Referring first to FIG. 1, the moisture measuring unit 1 is in the form of a rectangular box 3 provided with a carrying handle 5 and having a removable cover 7 normally held in place by two toggle-type catches 9. Disposed inside the box 3 is a measuring cell 11. The measuring cell 11 includes a base plate 13 formed of electrically insulating dielectric material mounted by the pillars 14 on a faceplate 15 itself bolted to the sides of box 3.

This base plate 13 is formed (see FIGS. 4 and 5) with a circular central aperture 17, and with two shallow grooves 19 and 21 in its upper surface, the grooves being concentric with the aperture 17. An outer cylinder 23 formed of aluminum rests on the plate 13 with its lower end entered in the outer groove 21, and an inner cylinder 25 also formed of aluminum also rests on plate 13 with its lower end entered in the inner groove 19. The annular space 27 defined by these two cylinders forms a capacitive cell. An insulating sleeve 28 extending through an aperture in faceplate 15 and engaging the upper end of outer cylinder 23 positions and holds in place cylinder 23.

The upper end of inner cylinder 25 is substantially closed by an annular plate 29 formed of an electrically insulating dielectric material carrying at its center a flanged cylindrical boss 31 having a central bore in which is mounted an upwardly extending tube 33. The upper end of the tube carries a bush 35 serving as a guide for a vertical metal rod 37 which at its upper end is secured to a plunger 39 and which extends down from that plunger through the bush 35, the tube 33, the inner cylinder 25 and the aperture 17 in base plate 13, to a level below that base plate.

Slidably fitted over the plunger 39 is a tube 41 forming the central boundary of a weighing chamber 43, the upper end of the tube 41 being closed by a plug 45. The weighing chamber includes a cylindrical outer wall 47 and the bottom of the weighing chamber 43 is formed in part by an annular frustoconical downwardly and inwardly converging wall 49 which is a continuation of the lower end of the cylindrical wall 47 and partly by an annular dump plate 51 which slopes downwardly and outwardly and is provided at its radially outer edge with a lip 53 which engages the lower rim of the wall 49. The lower end of the tube 41 carries a circular split-ring 55 and the plunger 39 (see FIG. 6) is formed with a peripheral recess 57 this arrangement being effective normally to lock the tube 41 relative to the plunger 39 in the position shown in FIG. 4.

Figure 3:
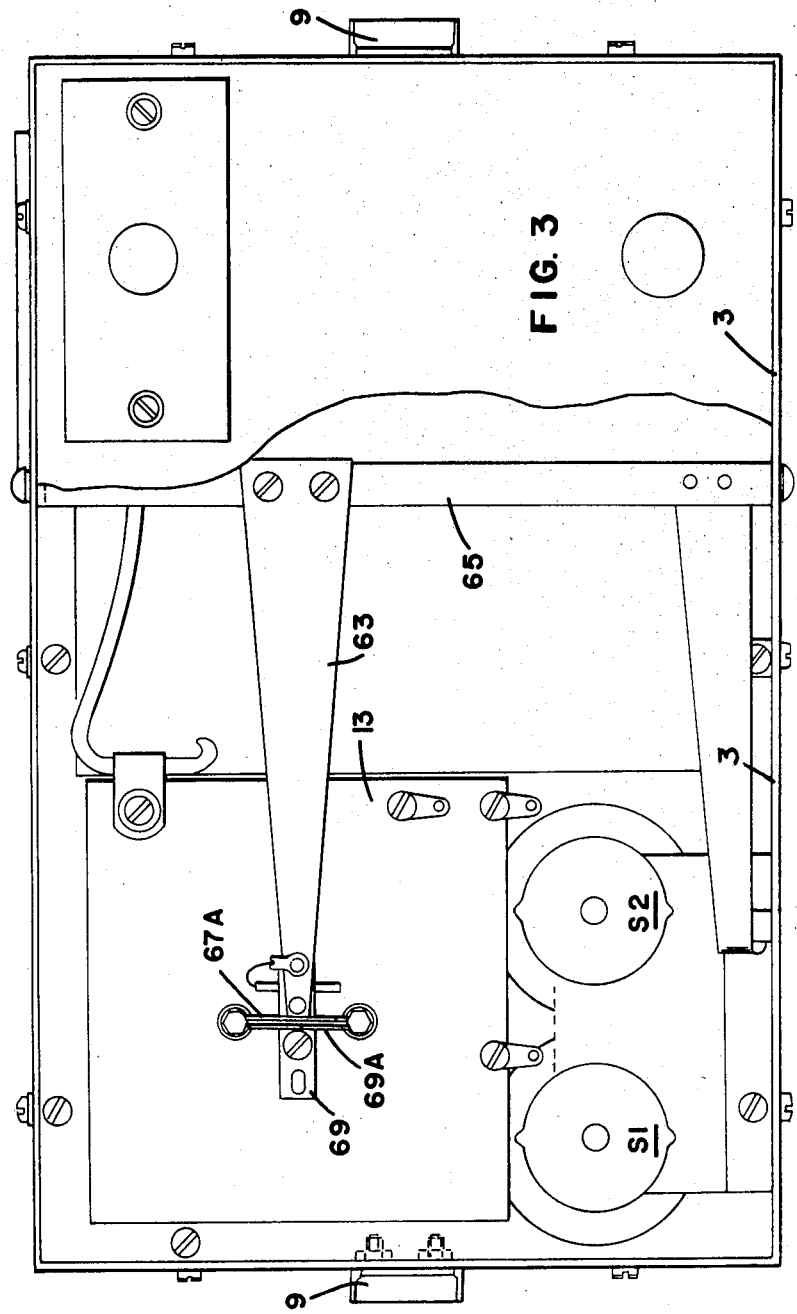
FIG. 3 is an underneath view of the unit shown in FIG. 1 with part of the lower casing broken away to show detail normally concealed.

To the lower end of the rod 37 is pivotally connected a block 61 of insulating material and the rod with the parts carried by it is biassed upwardly by a leaf spring 63 anchored at one end through a rotatable bar 65 (see FIGS. 1 and 3) to the Box 3 and fixed at the other end to the insulating block 61. This block 61 also carries a bent metal strip 67 having a downwardly extending part 67A which, as the rod 37 moves up and down, passes with only a small spacing a facing vertical part 69A of a similar metal strip 69 supported on an insulating pillar 71 from the base plate 13. The Rod 37 is grounded through the roll pin via spring 63 to the Box 3 (FIG. 3).

Figure 4:
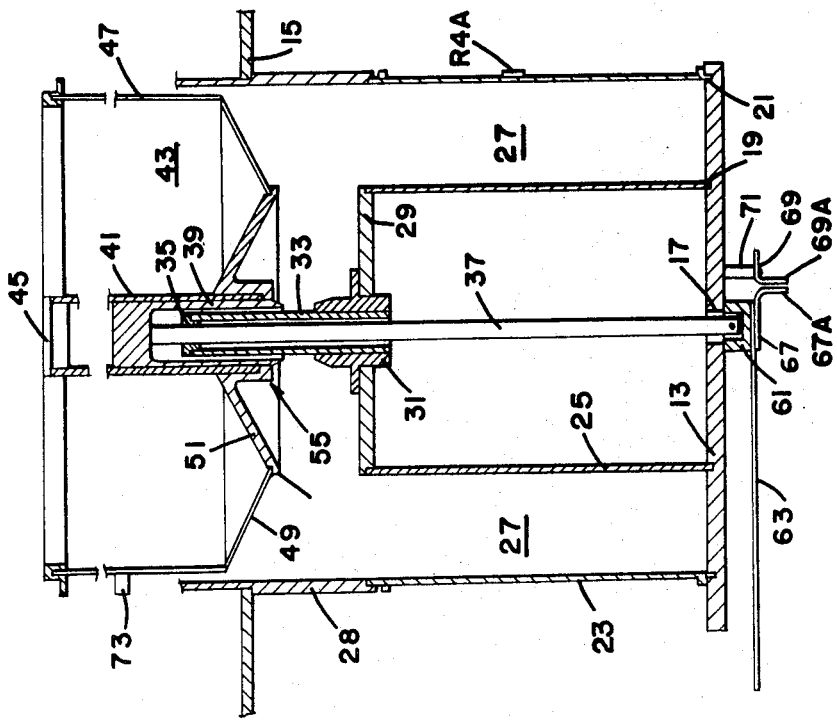
FIG. 4 is a sectional side elevation of a measuring cell indicated in FIG. 2.
Figure 5:
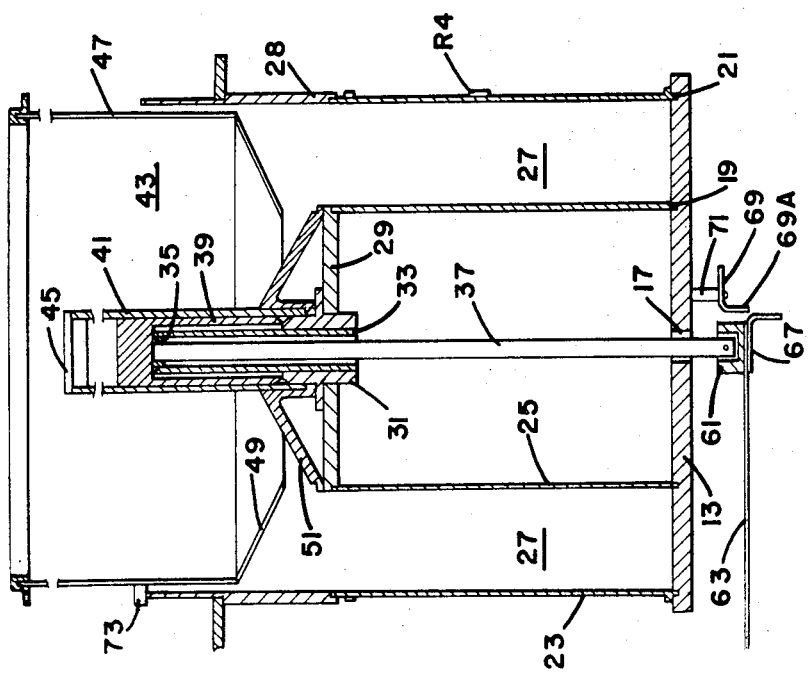
FIG. 5 is a sectional side elevation similar to FIG. 4, but showing the movable parts in an alternative operating position.
Figure 6:
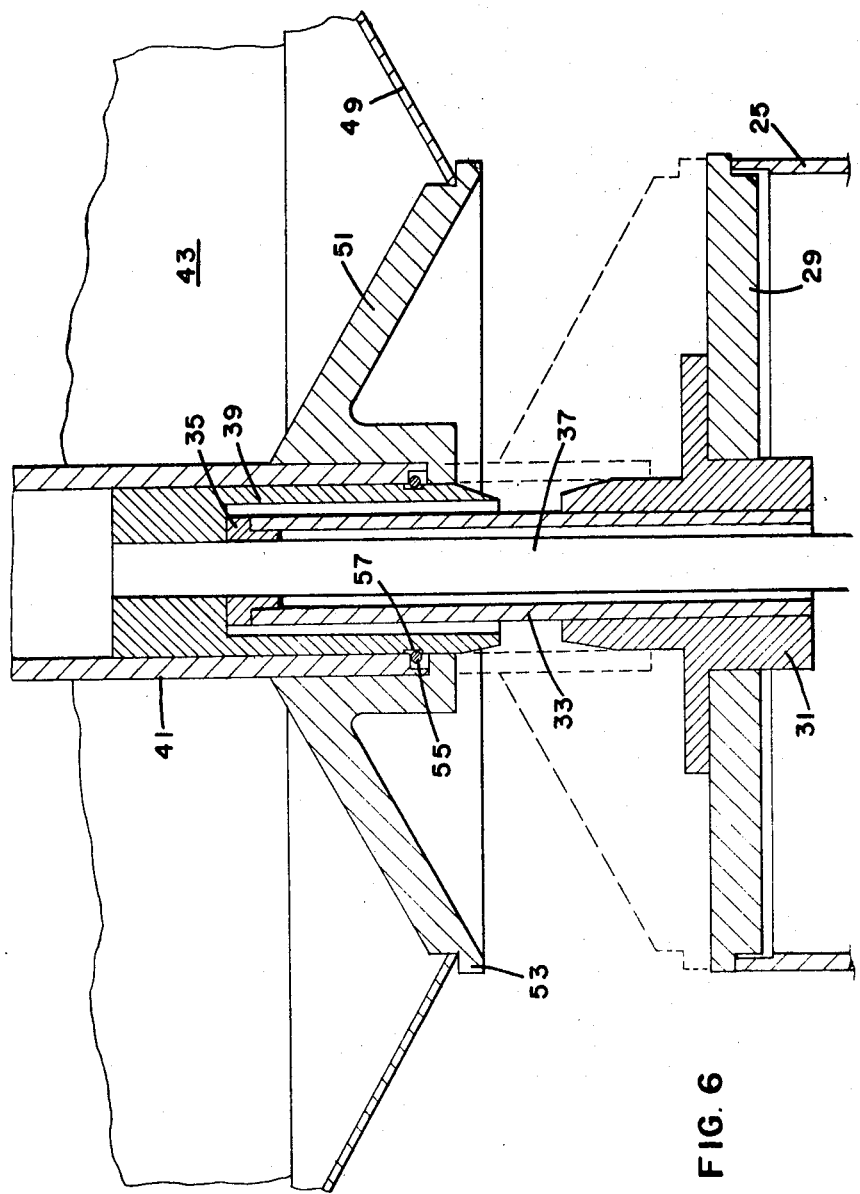
FIG. 6 is a sectional side elevation of part only of the device shown in FIGS. 4 and 5, and is drawn to a larger scale than those figures; further, the parts are shown in the third working position.

It will be seen that the spring 63 will normally tend to hold the chamber 43 up in the position shown in FIG. 4, the block 61 engaging the bottom of base plate 13 so that an appreciable pre-tension exists in the spring 63. The amount of pre-tension can be changed by rotating bar 65. When granular material such as grain is fed into the chamber 43, nothing will happen until about 95 percent of the desired sample weight has been added. At that point, the total weight of the rod 37 and the parts carried by it will exceed the preloading force of the spring 63 and the whole assembly will commence to move downwardly. Strip part 67A, which forms a first plate of a capacitor, will start to go out of mesh with part 69A of strip 69, which forms a second plate of this capacitor. When the sample in the chamber 43 reaches approximately 105 percent of the desired weight, the capacitor plates will be fully out of mesh. At this point, the underside of the top part of the plunger 39 will butt against the bush 35, as shown in FIG. 6, and further downward movement of the plunger 39 is prevented. It will be understood that the intention is not to provide other than 100 percent of the proper specimen weight, but the present description indicates how the apparatus would operate when so overfilled.

As will be explained later, the operation so far described can be used to effect a weighing of the proper amount of material into the chamber 43 to carry out a "moisture" content test, and the next step is to transfer the measured weight of material into the annular space 27 forming the actual capacitance cell.

When force is now applied to the upper end of the tube 41, this force will spring split-ring 55 out of the recess 57 in the plunger 39, and will permit the tube 41 to move downwardly over the plunger 39.

Reverting to the chamber 43, three stops 73 are provided spaced evenly round the periphery of the cylindrical wall 47. The location of stops 73 is such that the stops engage the top of sleeve 28 shortly after split ring 55 springs out of the recess 57. Thus continued downward movement of the tube 41 carries with it the dump plate 51 but continued movement of chamber bottom wall 49 is prevented, so opening an annular opening between these two parts through which the granular material in the chamber 43 is dumped into the space 27.

Figure 7:
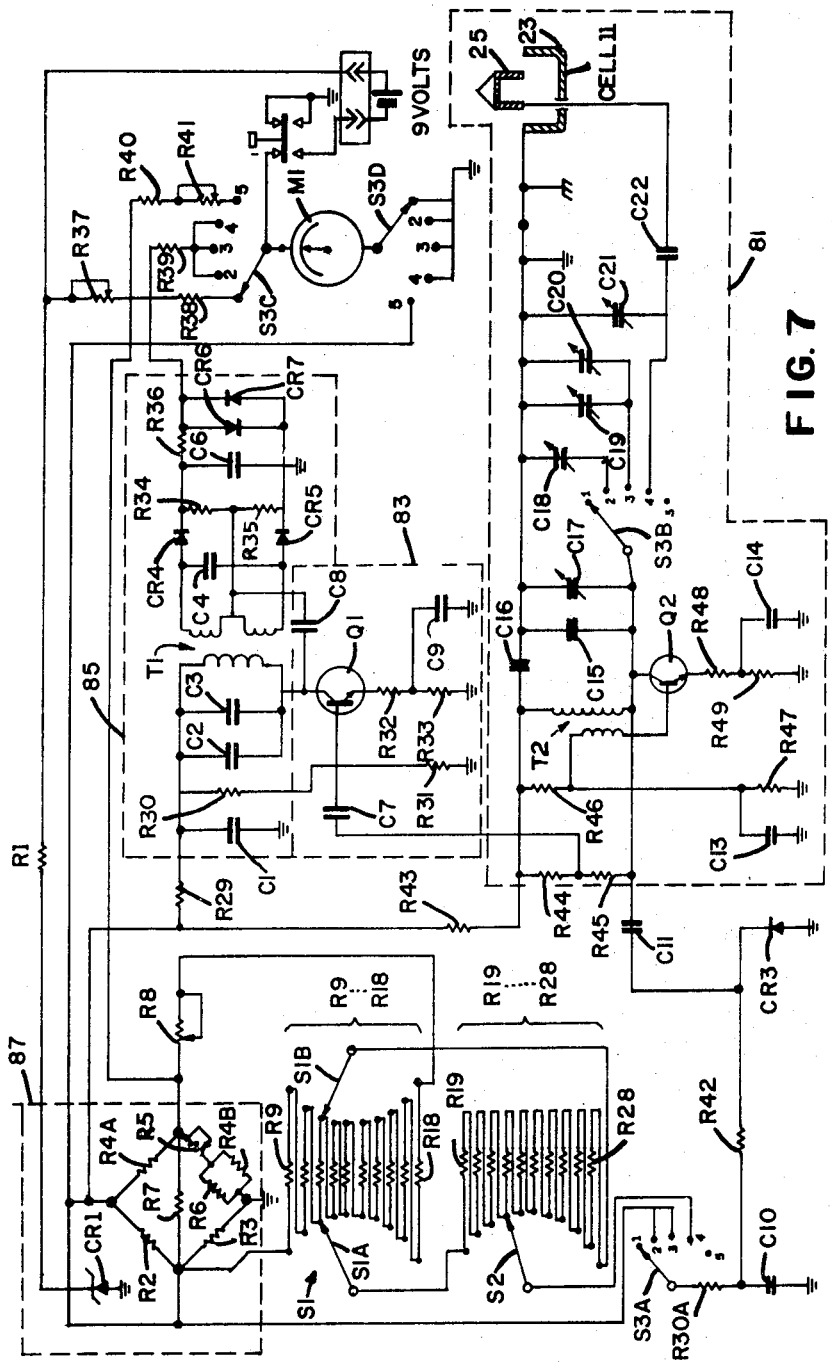
FIG. 7 is a circuit diagram of moisture measuring means including the cell shown in FIGS. 4 and 5.

Referring now to FIG. 7, in this figure the outer cylinder 23 and the inner cylinder 25 of the capacitive cell are indicated diagrammatically while the capacitor formed by the facing parts 67A and 69A is indicated as a capacitor C20. This capacitor forms part of an oscillator circuit 81, the active element in which is a transistor Q2, and it will be seen that the cell 11 also is part of this oscillator circuit. Thus any change in the value of either capacitance will change the oscillator frequency.

The output from oscillator circuit 81 is fed through a buffer amplifier 83 to a fixed-tuned discriminator circuit 85, whose output will be positive or negative d.c. depending upon whether the oscillator frequency is above or below the frequency to which the discriminator is tuned. When the oscillator frequency equals the tuned discriminator frequency, the output from the discriminator is zero. A center zero meter M1 provides an indication of the magnitude and polarity of the output from the discriminator.

Automatic temperature compensation is provided by a temperature sensing element in the form of two thermistors R4A and R4B included in a temperature compensation circuit 87 which is used to control the bias voltage of a varactor diode CR3 which is connected in parallel with the cell 11.

In FIG. 7 the various components of the circuit are indicated in conventional manner and are given reference numerals which are listed below with details of the actual components used.

| Transistors | | Diodes | |
| --- | --- | --- | --- |
| Q1 | 2N3855A | CR1 | 6.2 volts |
| Q2 | 2N3663 | CR3 | BA 102 |
| | | CR4 | IN87A |
| | | CR5 | IN87A |
| | | CR6 | IN87A |
| | | CR7 | IN87A |

| Capacitors (in picofarads) | | Resistors (in ohms) | |
| --- | --- | --- | --- |
| C1 | 7,500 | R1 | 160 |
| C2 | 56 | R2 | 3,010 |
| C3 | 3.3 | R3 | 1,820 |
| C4 | 47 | R4A | 47,000 (thermistor) |
| C6 | 470 | R4B | 47,000 (thermistor) |
| C7 | 7,500 | R5 | 22,000 |
| C8 | 82 | R6 | 48,700 |
| C9 | 7,500 | R7 | 39,200 |
| C10 | 7,500 | R8 | 220,000 |
| C11 | 2,700 | R9 to R28 — each 36,000 | |
| C13 | 7,500 | R29 | 15 |
| C14 | 7,500 | R30 | 22,000 |
| C14 | 12 | R30A | 22,000 |
| C16 | 7,500 | R31 | 22,000 |
| C17 | 1.3–5.4 | R32 | 22,000 |
| C18 | 3- 35 | R33 | 1,000 |
| C19 | 3-35 | R34 | 10,000 |
| C20 | Weighing Cap | R35 | 10,000 |
| C21 | 3.–10. | R36 | 8,200 |
| C22 | 100 | R37 | 220,000 |
| | | R38 | 270,000 |
| | | R39 | 4,700 |
| | | R40 | 4,700 |
| | | R41 | 47,000 |
| | | R42 | 22,000 |
| | | R43 | 15 |
| | | R44 | 120 |
| | | R45 | 470 |
| | | R46 | 22,000 |
| | | R47 | 10,000 |
| | | R48 | 22 |
| | | R49 | 820 |

The circuit also includes a first switch S1 (TENS of temperature compensation setting) having ganged moving contacts S1A and S1B, a second switch S2 (UNITS of temperature compensation setting), and a third switch S3 (FUNCTION switch) having ganged moving contacts S3A, S3B, S3C and S3D.

Calibration of the equipment takes place in the factory, and this is effected with no material in either the chamber 43 or the space 27 by the use of a calibration procedure using a predetermined test capacitor. Capacitor C21, which is connected in parallel with the cell 11, has a scale graduated in divisions 0-100, and the test capacitor is applied in parallel to this capacitor C21. The capacitor C18 can be used as a substitute for the cell as filled with grain having a predetermined percentage moisture content and switched in to permit checking of the proper setting of the oscillator frequency. Capacitor C19 can be preset to correspond to the weight of the desired sample, and clearly this setting can readily be effected using orthodox scales to weigh accurately a proper sample, and putting this weighed sample into the chamber 43 with switch S3 at position 3 and bringing the meter M1 to read 0 by proper adjustment of capacitor C19.

It will be seen from FIG. 4 that the resistor R4A is mounted on the outside of the outer cylinder 23, in intimate contact with that cylinder and this senses the grain temperature. A second thermistor R4B is mounted near the surface of the box 3 to sense ambient temperature. As can be seen in FIG. 7, these resistors R4A and R4B are connected into a bridge circuit, and the constants of this bridge circuit are such that when the temperature of thermistor R4A is 72° F, the bridge output (voltage across resistor R7) is zero. At any other temperature, the bridge output voltage will be proportional to the difference between the cell temperature and 72° F. The output will be negative or positive, depending upon whether the cell temperature is below or above 72° F.

As shown in FIG. 7, the output from the bridge controls the bias voltage of the varactor diode CR3, which is connected in parallel with the cell 11. The magnitude of this control voltage can be set by means of external control switches S1 and S2 to allow for variations in temperature coefficients between various grains to be tested. Thus the operator of the machine is provided with a set of charts listing the various grains with which the machine is to be used, and indicating the appropriate settings of the control switch contacts S1A and S1B and S2. FIG. 8 shows one such chart.

The apparatus described above is used as described below:

1. Install the unit on a level surface. This is necessary to obtain accurate weighing.
2. Set the TEMPERATURE COMPENSATION Selector Switches S1 and S2 to the value indicated on the calibration chart (see FIG. 8) for the grain or seed to be tested. The T.C. setting for a number of grains and seeds will change with moisture percentage. If such is the case, set the T.C. selector switches to the "Initial T.C. setting" shown at the top of the respective chart.
3. Lift the Loading Dump Mechanism until it locks in the "weighing" position by pulling up the center post (tube 41) in the cell. Make sure that the bottom portion of the grain cup is centered properly on its conical seat. Ensure that the three pins on the grain cup are clear of storage slots formed in sleeve 28 by rotating the grain cup (item 47).
4. Note the sample weight in grams on the calibration chart (normally 100 grams). A number of grains and seeds are weighed in either 60 or 80 gram samples and require a counter weight (40 grams or 20 grams) called up on the chart. If required slide the required counterweight over the center post of the grain cell.
5. Switch the FUNCTION switch S3 to position "1 — TEST BATTERY." Press the POWER toggle switch toward you. The meter should read in the green area at end of scale indicating that the battery is serviceable. This switch is spring loaded and must be held "on."
6. FUNCTION switch to position 2 — CALIBRATE. Rotate moisture dial to 50. Press the POWER toggle switch and adjust the CALIBRATE control (capacitor C17) until the meter reads zero (in the red area).
7. FUNCTION switch to position 3 — WEIGH. Press the POWER toggle switch and pour the grain sample slowly into the grain cup, distributing the sample evenly. Initially the meter needle will be far to the left of zero, but when approximately 90 percent of the required sample weight has been poured into the cup, the meter needle will start to move toward the center of the scale. Slowly pour some more grain into the cup until the meter reads zero. If the meter reads to the right of zero, use a spoon to remove some of the sample until the meter reads zero.

NOTE: It is good practice when the zero point has been reached to gently tap the box with your finger to remove any possible source of friction.

8. If a counterweight was used, remove the weight from the center post and return it to its storage position on the lid. Distribute the sample evenly in the cup with your finger and then strike the top of the center post firmly with your finger (in a downward motion) to release the trip mechanism. The sample will now flow into the measuring cell. REMOVE THE GRAIN CUP before proceeding further and ensure that the center post cannot be pushed down any further.
9. If the sample temperature is different from the meter temperature, allow 1½ to 2 minutes for the meter to stabilize.
10. FUNCTION switch to position 4 — READ MOISTURE; press the POWER switch and adjust the Moisture Master dial (capacitor C21) until the meter reads zero. Return the switch to position 2 — CALIBRATE. If the meter does not read zero adjust the CALIBRATE control to obtain a zero reading. Then switch back to position 4 — READ MOISTURE and turn the dial for zero meter reading.
11. Note the dial reading and cross refer to the relevant calibration chart (FIG. 8) for the actual moisture percentage. If the T.C. switches were set to the "Initial T.C." setting as explained in step 2, cross refer the dial reading to the calibration chart and note the T.C. setting opposite the dial reading.

If it is the same as the "Initial T.C." setting, read the moisture percentage. If it is not the same, reset the TC setting to that noted on the chart and repeat Step 10. (If necessary repeat this step until there is no change in the T.C. setting, allowing you to accurately determine the moisture percentage).

12. Empty the cell by grasping the cover latches and turning the meter upside down. Return loading dump mechanism to storage position.

NOTE: Switch position 5 — READ TEMPERATURE is provided to give an indication if the temperature of the sample and/or the cell is within the range of the automatic temperature compensation circuit. The meter reading should be within −18 to +25 divisions on the scale.

In operation, the change in capacitance caused by the operation of the bridge under the control of the thermistors R4A and R4B is equal and opposite to the change in the capacitance of the sample produced by the said temperature difference. The second thermistor R4B is desirable, since due to thermal losses, which vary with the ambient temperature, thermistor R4A cannot sense the actual grain temperature. The error is a function of the ambient temperature, and thermistor R4B provides compensation.

It will be seen that the moisture meter which has been described above is simple to operate and does not require any prior preparation of the sample. No external weighing of the sample is necessary, and yet the measurement of moisture content is carried out on a sample of accurately known weight. Experience has shown that consistent moisture measurements are obtained only if the manner of packing the material being measured into the capacitive cell is the same from test to test, and the apparatus described effects dumping of the same mass of material from the same height in the same pattern from test to test.

The feature of automatic temperature compensation avoids the need to apply "corrections" to the readings obtained from the apparatus. All that is necessary is to set the control switches to suit the particular material being tested in accordance with a first simple instruction chart, and to interpret the scale reading of the capacitor C21 on a second equally simple chart.

The moisture measuring apparatus described above can be used with materials other than grain samples. When so used, its readings are basically a measure of the mass dielectric constant of the material being tested, and therefor in a set of samples having some variable parameter, which parameter affects the dielectric properties of the test specimen as a whole, the apparatus can be used to provide an indication of the value of that parameter.

The apparatus so far described is that described in the abovementioned copending application. The improvement which is the subject matter of the present application is to be found in FIGS. 9 and 10.

Figure 9:
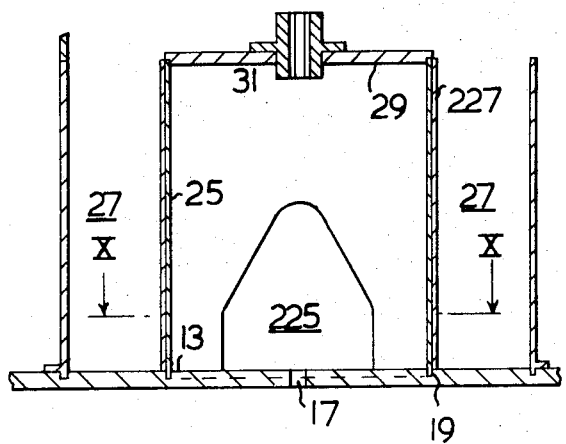
FIG. 9 is a sectional side elevation of a measuring capacitive cell shown in FIG. 4, and shows the modification to which the present invention is directed.
Figure 10:
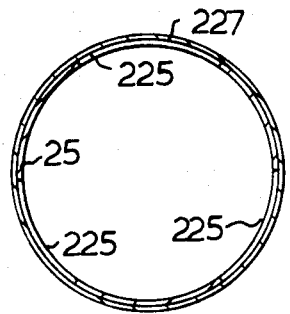
FIG. 10 is a sectional plan view taken on the line X—X of FIG. 9.

Referring now to FIG. 9, this illustrates an improved form for the inner cylinder 25 of the capacitive cell. Evenly spaced around the periphery of the cylinder 25 are three cut-outs of which one, cut-out 225, is shown clearly in FIG. 9, and the other two of which are similar in shape and size. Fitted over the outside of cylinder 25 is a thin sleeve 227 of electrically insulating material, which serves to seal the cut-outs to prevent material in the annular space 27 from entering the space within cylinder 25.

By the provision of the modified inner cylinder described above, the capacitive cell is made less sensitive to variations in the bushel weight of the specimen to be tested for moisture content. It will be appreciated that although the device described with reference to FIGS. 1 to 6 serves to measure the capacitance of a predetermined weight of the specimen, the volume of the weighed sample will depend upon its average density. Take, merely to illustrate this point, a purely imaginary specimen having a weight of 100 grams, and which is a mixture of two kinds of spheres, the spheres of one kind having a diameter of one-eighth inch and the spheres of the other kind having a diameter of three-sixteenths inch. One could make up different mixtures, all having the same weight, but having different proportions of the two kinds of spheres.

When these specimens are dropped into the annular space 27, in view of their different volumes they will fill it respectively to different levels. Further, to a first order approximation, it will be found that the dielectric constants of the three samples are inversely proportional to their volumes.

Mixture 1
| | |
|---|---|
| 100 grams of spheres, all ⅛ inch diameter | |
| Volume | 80 units |
| Height H.1 | 80 units |
| Dielectric constant E.1 | 125 units |

Mixture 2
| | |
|---|---|
| 100 grams of spheres, equal numbers of two sizes respectively ⅛ inch and 3/16 inch diameters | |
| Volume | 100 units |
| Height H.2 | 100 units |
| Dielectric constant E.2 | 100 units |

Mixture 3
| | |
|---|---|
| 100 grams of spheres, all 3/16 inch in diameter | |
| Volume | 125 units |
| Height H.3 | 125 units |
| Dielectric constant E.3 | 80 units |

Figure 11:
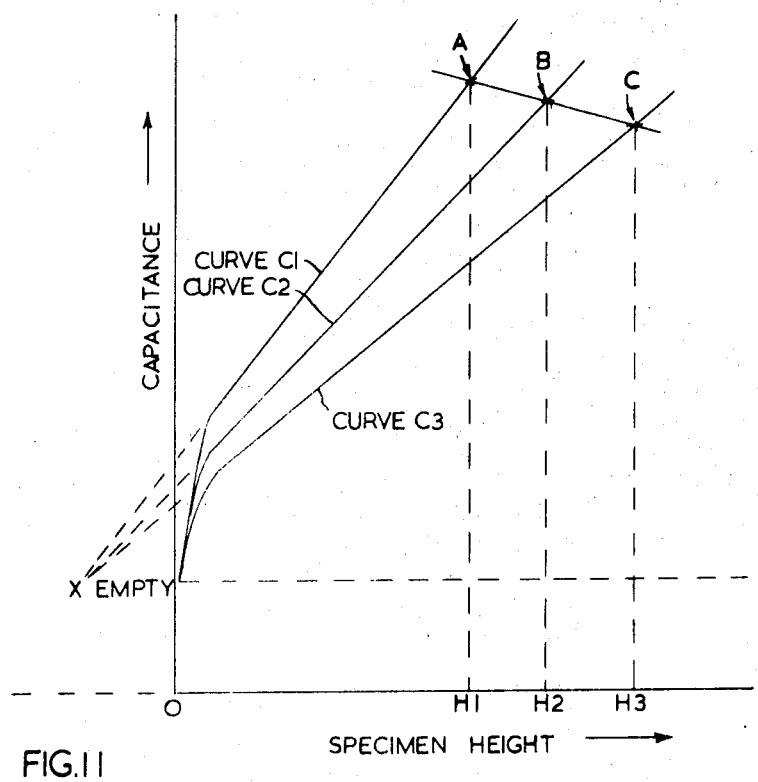
FIG. 11 is a graphical representation of the operating characteristics of the measuring cell shown in FIG. 4.

If the cell were gradually filled up, in turn, with mixtures 1, 2 and 3, the capacitance versus height relationships would be represented by curves C1, C2 and C3 respectively in FIG. 11. Points A, B and C correspond to the capacitance for 100 grams of each mixture. Due to the empty cell capacitance and associated fringing effects, the indicated capacitance for equal weights of the three mixtures varies with the density of these mixtures.

It is not possible, of course, to eliminate the actual capacitance of the empty cell, and its proportional effect on these curves, but by the present invention a compensating effect is obtained. This will be clear from FIG. 12. The total measured capacitance will, for each of the three samples, be the sum of the capacitance of the lower part of the cell, i.e., up to the level of the top of the cut-outs 225, and the capacitance of the upper part of the cell, i.e., above the top of cut-outs 225. If the change in the capacitance of the lower part of the cell, produced by the differences in dielectric constant E1, E2 and E3 between samples, can be made exactly equal, but opposite, to the change in the capacitance of the upper part of the cell, produced by the differences in filling height H1, H2 and H3, then changes in bushel weight over a working range can be largely compensated for.

Figure 12:
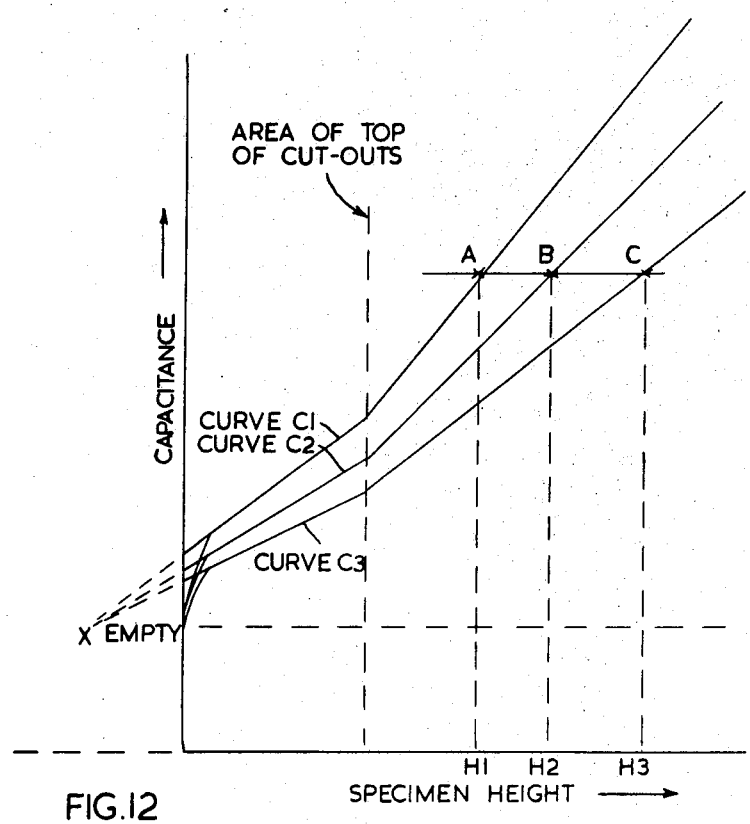
FIG. 12 is a graphical representation of the operating characteristics of the improved measuring cell shown in FIGS. 9 and 10.

It will be seen from FIG. 12 that the novel form of the inner wall of the cell shown in FIG. 9 does provide this result, by the reduction of the capacitance change per unit height (slope of curves) over the lower portion of the cell.

Those skilled in the art will appreciate that the cutouts can be provided in either the inner wall as shown, or the outer wall, or both, as desired, as long as sealing members of electrically insulating material are provided to prevent material spillage.

Further, it is not essential that the cut-outs shall be evenly distributed about the periphery of the annular capacitive cell. As long as the lower part of the annular chamber is modified, compared with an upper part of the chamber which embraces all working variations in operating level, to produce in the two parts of the cell mutually compensating effects as the specimen bulk density changes, the present invention is satisfied.

The expression "cut-outs" is of course descriptive of the shapes involved and does not relate to the manner of manufacture. It would be possible, even if probably uneconomic, to provide the electrically conductive wall or cells of the cell by electrodeposition on prepared areas of a non-conductive substrate, to produce the desired configuration.

I claim:
1. A capacitative measuring cell comprising:
    a. a first upright electrically conductive wall;
    b. a second upright electrically conductive wall, spaced from the said first wall and electrically insulated from that first wall;
    c. at least one of the two walls having apertures extending over a lower portion of the cell so that the capacitance between the two walls per unit height over the said lower portion is less than the capacitance per same unit height over an upper portion of the cell;
    whereby variation in grain size in a sample filling both the lower portion of the cell and the upper portion of the cell has a lesser effect on the capacitance of the cell than it would have in the absence of such apertures in the lower portion of the wall or walls.

2. A capacitative measuring cell comprising a first upright electrically conductive wall, a second upright electrically conductive wall spaced from the said first wall and electrically insulated from that first wall, one or both of the two walls having apertures extending over a lower portion of the cell so that the capacitance between the two walls per unit height over the said lower portion is less than the capacitance per same unit height over an upper portion whereby variation in grain size in a sample filling both the lower portion of the cell and the upper portion of the cell has a lesser effect on the capacitance of the cell than it would have in the absence of such apertures the lower portion of the wall or walls.

3. Apparatus for measuring a capacitance-effecting parameter of a certain mass of particulate material, such as the moisture content of grain samples, comprising:
    a. a supporting frame;
    b. receptacle means for receiving a sample of particulate material;
    c. spring means mounting the receptacle means with respect to the supporting frame, said spring means being sufficiently strong as to avoid substantially deflecting and thereby moving the receptacle with respect to the frame when the receptacle is empty, but insufficiently strong to prevent such deflection at the point when the receptacle has received a quantity of particulate material equalling said certain mass;
    d. means sensitive to movement of the receptacle for indicating when said receptacle has moved due to deflection of said spring means, thereby providing an indication of when the receptacle has received said certain mass of particulate material;
    e. a capacitance cell including at least two spaced capacitor plates, said cell being disposed to receive said certain mass of particulate material when the latter is dumped from said receptacle;
    f. means for dumping said certain mass of particulate material from said receptacle into said capacitance cell from a constant height with respect to the capacitance cell whereby the certain mass of particulate material forms a dielectric between the capacitor plates of said cell;
    g. an oscillatory circuit including said capacitance cell, said capacitance cell being the frequency determining element of said oscillatory circuit;
    h. temperature sensitive means effectively incorporated in said oscillatory circuit for automatically compensating for any expected oscillation frequency change in said circuit due to deviation of the temperature of the capacitance cell from a preselected standard temperature;
    i. means for sensing the oscillation frequency of said oscillatory circuit; and
    j. calibrated means effectively incorporated in said oscillatory circuit for adjusting the oscillation frequency of said circuit, whereby the amount of adjustment needed to restore the oscillation frequency to a preselected value when said cell contains said certain mass of particulate material, can be ascertained as a measure of capacitance-affecting parameters of the certain mass of particulate material; said capacitance cell comprising:
        1. a first upright electrically conductive wall;
        2. a second upright electrically conductive wall, spaced from the said first wall and electrically insulated from that first wall; and
        3. at least one of the two walls having apertures extending over a lower portion of the cell so that the capacitance between the two walls per unit height over the said lower portion is less than the capacitance per same unit height over an upper portion of the cell.

4. Apparatus according to claim 3 and in which:
    a. a capacitive device serves as the said means for indicating when the receptacle has moved and includes relatively movable plates the relative position of which is changed by the weight of material in the hopper, so varying the capacitance of the capacitive device; and
    b. the capacitive device is arranged to control the said operating frequency of the said oscillatory circuit;
    whereby an operator by observing the indication of the output from the discriminatory means can observe when the frequency of the oscillatory circuit passes through a value indicating that the weight of material received has reached the said predetermined value.

5. Apparatus according to claim 4, and in which:
a. a manually adjustable capacitor is included in the said oscillatory circuit;
whereby an operator by adjustment of that capacitor can select a desired value for the received material.

6. Apparatus according to claim 5, and in which:
a. the dump means are arranged and adapted to dump the material in an angularly evenly distributed manner into the said annular chamber.

7. Apparatus according to claim 3, and in which:
a. manually operated means operate the dump means;
whereby an operator can delay the dumping of the material into the annular chamber, after a weighing of the material is finished, until it is convenient to effect dumping.

8. Apparatus according to claim 3, and in which:
a. a floor provides the bottom of the said receptacle;
b. an annular radially outer section of the said floor is downwardly convergent in a frustoconical manner;
c. a radially inner section of said floor is downwardly convergent with the said outer section;
d. the said floor is an annular floor of V-shaped transverse cross-section; and
e. dumping is effected by movement of one of these sections vertically relative to the other of these sections.

9. Apparatus according to claim 3, and in which:
a. a resistive bridge circuit is part of the said temperature sensitive means;
b. a temperature sensitive resistor is part of the said resistive bridge circuit;
c. the said resistor is mounted on one of the said spaced metal surfaces of the cell.

10. Apparatus according to claim 9, and in which:
a. a second temperature sensitive resistor is arranged to sense ambient temperature;
b. the said second resistor is part of the said bridge circuit; and
c. that second resistor is so located in the said bridge circuit is such as to compensate for errors in the indication by the first temperature sensitive resistor which arise from heat exchange between the cell and the surrounding atmosphere.

11. Apparatus according to claim 9, and in which:
a. a semiconductor device is arranged to act as a capacitor;
b. an output voltage from the said bridge circuit is applied as a bias voltage to the said semiconductor device;
c. the capacitance of the semiconductor device varies in accordance with variations in the output voltage from the bridge circuit; and
d. the semiconductor device is part of the said oscillatory circuit.

12. Apparatus according to claim 3, and in which:
a. the means sensing the oscillation frequency provide a direct current output; and
b. the polarity of that direct current output is indicative of the sense of the deviation of the said operating frequency from the said predetermined value.

13. Apparatus according to claim 3, and in which:
a. a variable capacitor is arranged as the said calibrated adjustment means;
b. the said variable capacitor is included in the said oscillatory circuit; and
c. the said variable capacitor is effective to vary the operating frequency of that circuit.

* * * * *